UNITED STATES PATENT OFFICE.

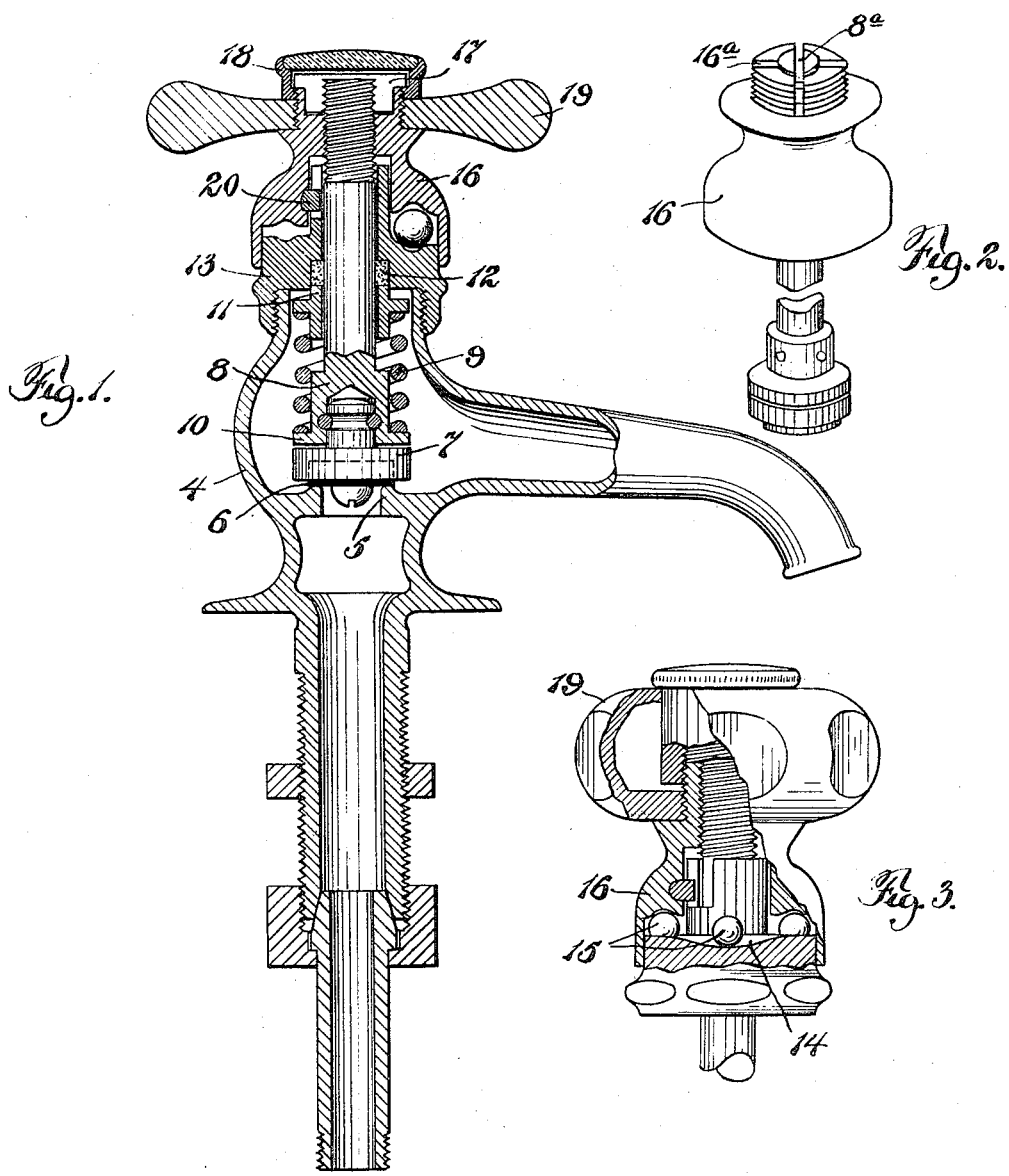

ARTHUR M. HOUSER, OF CHICAGO, ILLINOIS, ASSIGNOR TO CRANE COMPANY, OF CHICAGO, ILLINOIS, A CORPORATION OF ILLINOIS.

SELF-CLOSING BASIN-FAUCET.

1,069,876.          Specification of Letters Patent.          Patented Aug. 12, 1913.

Application filed February 15, 1910. Serial No. 543,984.

*To all whom it may concern:*

Be it known that I, ARTHUR M. HOUSER, a citizen of the United States, residing at Chicago, in the county of Cook and State of Illinois, have invented certain new and useful Improvements in Self-Closing Basin-Faucets, of which the following is a specification.

This invention has reference to the provision of certain improvements in basin faucets or valves whereby to make the device easier in movement, more durable, more accessible for repair or renewal of parts, and in general simpler and more effective in operation.

A further object of this invention is the provision of a faucet of the character specified in which ready adjustment can be made to take up the wear on the parts or upon the gasket on the seat, and in which such adjustment can be accomplished without taking the faucet itself apart and without disarranging the relation of the stop members which regulates the amount of movement of the actuating wheel or handle.

The above as well as such other objects as may hereinafter appear I attain by means of a construction which I have illustrated in preferred form in the accompanying drawing wherein Figure 1 is a vertical sectional elevation through a device embodying my improvement, Figure 2 is a perspective view of a portion of the apparatus removed from the main body or casing and, Figure 3 is another detailed view showing a slightly modified form of handle and cut in section sufficiently to indicate the arrangement of the stop device and of the ball bearing features.

Referring now more particularly to Figure 1 it will be seen that I have therein shown a sectional view of a faucet, the body of which is marked 4, which has a seat at 5 closed by a renewable washer or disk 6 held in a disk holder 7 which has a swivel connection with the lower end of the stem 8 as clearly shown in the drawing. As a means for holding the valve closed a spring 9 is provided which is arranged to bear against a flange or cylinder 10 on the lower end of the stem 8 so that the pressure of the spring will not come directly against the rear of the disk holder 7 and thus produce excessive wear upon the disk or valve proper 6. The upper end of the spring 9 is arranged to bear against a follower or gland 11 which serves the purpose of compressing the packing 12 within the recess or stuffing box in the bonnet 13.

The upper surface of the bonnet 13 is provided with a number of inclined recesses or runways 14 shown clearly in Fig. 3 in which are located the balls 15 that, on the upper sides carry a movable ball race 16, which latter has threaded engagement with the upper end of the stem 8 and is held against rotation relative to the stem by means of the bar or key 17 the latter being swiveled within the index cap 18 in such manner that it will form a means for locking the movable ball race and the stem 8 against relative rotative movement in the position shown in Fig. 1.

The handle 19 is screwed on to the movable ball race or member 16 and held firmly in place by the index cap 18 being screwed down upon it.

As a means for limiting the rotative movement of the handle and ball race to the amount necessary to secure full opening or closing of the valve, with the ball sockets designed as shown, I provide a lug 20 mounted within the part 16 and arranged to project inwardly into a recess formed in the bonnet 13 of suitable dimensions, as clearly indicated in Fig. 3, and which will stop the rotative motion of the parts at a quarter turn.

The arrangement of apparatus shown in Fig. 3 is, operatively, the same as that already described but the outline or configuration of the handle 19 is altered in the manner shown.

On examination of Fig. 2 it will be seen that in the upper end of the movable ball race four notches 16ª have been made which will serve to fix the bar 17 at a quarter turn but more could be used if for any reason they should be required, to get more accurate adjustment.

It will be obvious from consideration of the structure above described that the apparatus will operate with a minimum amount of friction or resistance, that the spring pressure will not bear directly upon the valve disk holder, but that the latter being swiveled in connection with the stem and the pressure of the spring arranged to bear against the flange or extension on the lower end of the stem, the valve disk proper or washer will be protected against rotative movement in the opening and closing of the device and give very much greater wear and will be less liable to leak than otherwise.

It will also be obvious that in order to adjust the device to secure a proper opening and closure with the proper limit of motion of the handle, all that is necessary is to remove the index cap which carries with it in swivel connection the bar 17 and then insert a screw driver in the slot 8ª, in the stem 8 and turn the stem the required amount, then replace the index cap in position with the bar engaging the proper notches.

Having thus described my invention what I claim as new and desire to secure by Letters Patent is:

1. A locking means for a valve stem comprising in combination, a threaded end upon said stem, a movable member having threaded engagement with said stem, and a locking bar engaging a slot in said stem, and notches in said member, substantially as described.

2. A locking means for a valve stem comprising in combination, a threaded end upon said stem, a slot in said end, a movable member having threaded connection with said stem, a notch in the movable member, and a locking key engaging the slot in the stem and the notch in the movable member.

3. A locking means for a valve stem comprising in combination, a threaded end on said stem, a slot in said end, a movable member having threaded connection with said stem, a plurality of notches in said movable member, and a locking key engaging the slot and a pair of notches in the movable member.

4. A locking means for a valve stem comprising in combination, a threaded end on said stem, a slot in said stem, a movable member having threaded connection with said threaded end of the stem, a notch in said movable member, a locking key adapted to engage the slot and the notch, and a cap which carries the said locking key fastened to the said movable member.

5. A locking means for a valve stem comprising in combination, a threaded end on said stem, a slot in said stem, a movable member having threaded connection with said threaded end of the stem, a plurality of notches in said movable member, a closure cap threaded over the movable member, and a locking key carried by the closure cap adapted to engage the slot and notches and lock the stem and movable member.

In testimony whereof I have hereunto signed my name in the presence of the two subscribed witnesses.

ARTHUR M. HOUSER.

Witnesses:
M. W. LINK,
F. W. McINTYRE.